(12) United States Patent
Moore (10) Patent No.: US 12,150,828 B2
(45) Date of Patent: Nov. 26, 2024

(54) DENTAL COMPONENT ORGANISATIONAL DEVICE

(71) Applicant: Gate Dental Services Ltd, Galway (IE)

(72) Inventor: Paul Moore, Galway (IE)

(73) Assignee: Gate Dental Services Ltd (IE)

(*) Notice: Subject to any disclaimer, the term of this patent is extended or adjusted under 35 U.S.C. 154(b) by 157 days.

(21) Appl. No.: 17/420,364

(22) PCT Filed: Dec. 31, 2019

(86) PCT No.: PCT/EP2019/087201
§ 371 (c)(1),
(2) Date: Jul. 1, 2021

(87) PCT Pub. No.: WO2020/141183
PCT Pub. Date: Jul. 9, 2020

(65) Prior Publication Data
US 2022/0087802 A1    Mar. 24, 2022

(30) Foreign Application Priority Data

Jan. 2, 2019 (GB) .................................... 1900035
Sep. 9, 2019 (GB) .................................... 1912961

(51) Int. Cl.
*A61C 19/02*    (2006.01)
*A45D 44/20*    (2006.01)

(52) U.S. Cl.
CPC ............ *A61C 19/02* (2013.01); *A45D 44/20* (2013.01)

(58) Field of Classification Search
CPC . A61C 19/02; A61C 2202/00; A61C 2202/01; A45D 44/20; B65D 51/1605; B65D 51/1627; B65D 51/1622; B65D 51/1611

USPC ............................... 220/785, 368, 369, 63.5
See application file for complete search history.

(56) References Cited

U.S. PATENT DOCUMENTS

| 3,437,224 | A | * | 4/1969 | Williams | ............... C12M 23/38 |
| | | | | | 215/307 |
| 4,898,276 | A | | 2/1990 | Georgakis | |
| 5,139,188 | A | * | 8/1992 | Scharf | .................... A61C 19/00 |
| | | | | | 224/217 |
| 5,249,963 | A | * | 10/1993 | McGarrigle | ......... A61C 19/006 |
| | | | | | 433/163 |
| D357,409 | S | * | 4/1995 | Past | .............................. D3/273 |
| 5,657,895 | A | * | 8/1997 | Rogge | ............... B65D 51/1627 |
| | | | | | 220/366.1 |

(Continued)

FOREIGN PATENT DOCUMENTS

| JP | H06509257 A | 10/1994 |
| JP | 2018521775 A | 8/2018 |

(Continued)

OTHER PUBLICATIONS

Search Report for GB1900035.5, dated Jun. 14, 2019.

(Continued)

*Primary Examiner* — Chun Hoi Cheung
(74) *Attorney, Agent, or Firm* — Fishman Stewart PLLC (57) ABSTRACT

Aspects of the present invention relate to a storage tray for storing dental components. The storage tray comprises a plurality of compartments arranged along an arc representative of a dental arch, each compartment corresponding to the position of a respective tooth on the dental arch.

14 Claims, 11 Drawing Sheets

(56) References Cited

U.S. PATENT DOCUMENTS

| | | | | |
|---|---|---|---|---|
| 6,085,930 | A * | 7/2000 | Curtis | B65D 81/263 |
| | | | | 206/508 |
| 6,182,820 | B1 * | 2/2001 | Rathbauer | A61C 19/10 |
| | | | | 206/83 |
| 6,932,213 | B1 * | 8/2005 | Distad | A61C 19/008 |
| | | | | 220/555 |
| 7,090,073 | B2 * | 8/2006 | Barnes | A61C 19/10 |
| | | | | 206/63.5 |
| 8,123,029 | B2 * | 2/2012 | Sarkissian | A47G 1/12 |
| | | | | 206/83 |
| 2004/0238390 | A1 | 12/2004 | Barnes | |
| 2006/0172250 | A1 | 8/2006 | Wen | |
| 2009/0155435 | A1 * | 6/2009 | Loaiza | B65D 1/36 |
| | | | | 426/396 |
| 2017/0056148 | A1 | 3/2017 | Krastev | |
| 2018/0214258 | A1 * | 8/2018 | Ruan | A61C 7/14 |
| 2018/0339821 | A1 * | 11/2018 | Ji | B65D 43/14 |

FOREIGN PATENT DOCUMENTS

| | | |
|---|---|---|
| KR | 20100004404 | 4/2010 |
| KR | 20150115692 A | 10/2015 |

OTHER PUBLICATIONS

English abstract for KR-20150115692.
Office Action for EP19842364.2, dated Jun. 5, 2023.
English translation of Office Action for JP2021538859, dated Sep. 27, 2023.

* cited by examiner

DENTAL COMPONENT ORGANISATIONAL DEVICE

TECHNICAL FIELD

The present disclosure relates to a dental component organisation device and in particular, but not exclusively, to an organisational tray for storing dental components. Aspects of the invention relate to a storage tray and to a storage tray comprising a plurality of dental components in the form of a kit.

BACKGROUND

Dentists are often required to carry out restoration work to repair damaged or missing teeth within a patient's mouth. Restoration work is typically classified into two types of restorations, namely: direct and indirect. Direct restoration work is a term used to define work that is fabricated and completed entirely within a patient's mouth. Conversely, the term indirect restoration work is used to describe work where a dental component, such as a veneer, crown or implant, is fabricated outside a patient's mouth prior to being fitted.

Patients often require indirect restoration work to be completed in multiple locations within their mouth during a procedure. This not only increases the complexity of the restoration procedure but also means that multiple dental components must be fabricated prior to commencing the procedure. Commonly, each dental component is fabricated for use in a specific location on a patient's jaws or dental arches. Due to the complexity of the procedure the dentist will organise the dental components prior to beginning work to ensure that the dental components are not mixed up or arranged in an unorderly manner. Arranging the dental components in an orderly manner helps improve the efficiency of a procedure.

The various dental components may be laid out on a planar surface such as a dental tray in the vicinity of the dental chair prior to commencing the procedure. Furthermore, the dentist may place a sheet of paper or fabric material on the tray and annotate the sheet to label each dental component. This is advantageous as no time is wasted during the procedure by the dentist searching for the dental component required to be positioned at the desired location within the patient's mouth.

However, there are hygiene issues with the aforementioned approach as the tray and/or the sheet material must be sterilised prior to positioning the dental components and tools on the planar surface. Furthermore, if the planar surface is knocked, the order of the components may be disturbed thereby delaying the dentist whilst carrying out the procedure and prolonging any discomfort the patient may be feeling.

It is an aim of the present invention to address one or more of the disadvantages associated with the prior art.

SUMMARY OF THE INVENTION

According to an aspect of the present invention there is provided a storage tray for storing dental components, the storage tray comprising a plurality of compartments arranged along an arc representative of a dental arch, each compartment corresponding to the position of a respective tooth on the dental arch.

Storing dental components for use in a dental procedure in a position that relates to the desired destination of the dental component in the patient's mouth beneficially improves the efficiency of the procedure and reduces the likelihood of an error. For example, the dentist may quickly select the correct dental component for a given tooth from the storage tray. This has the effect of reducing the overall time of a procedure thus in turn reducing the amount of time a patient must keep their mouth open.

The storage tray is particularly beneficial when the dentist is performing a procedure that requires the installation or use of multiple dental components. For example, if a dentist is fitting orthodontics to a patient where a dental component is required to be fitted to every tooth in the patient's mouth, the storage tray organises the components in such a way that correlates directly to the desired position along the patient's jaws.

In one embodiment the storage tray may comprise a dental notation system to label each compartment. In another embodiment the dental notation system may comprise notation corresponding to a lower dental arch and an upper dental arch.

The dental notation system further improves the clarity of the storage tray by providing additional guidance to the dentist in the form of recognised notation that directly links each storage compartment to a tooth in the dental arch. The storage tray may have dental notation relating to both the lower and upper dental arches such that a single storage tray may be used to store dental components for either the lower or upper dental arch.

In another embodiment each storage compartment may comprise a major axis that is longer than the minor axis. In one embodiment the storage compartments may be elliptical or substantially rectangular. The elliptical shape prevents dental components from rolling around within the compartments and generally maintains the components in the orientation they are placed in each compartment.

The elliptical or rectangular storage compartments advantageously provide sufficient storage space to store a dental component and also may be arranged in a space efficient manner along the arcuate axis.

In an embodiment the storage compartments may comprise a concave side wall. The concave side wall beneficially makes it easier for a dental component to be slid up, and removed from within the storage compartment. In particular, the storage compartments are advantageously shaped so as to easily enable a dentist to remove small dental components from within the compartments.

In another embodiment the storage compartment may have a planar base portion. Providing a planar base portion and a curved side wall to the storage compartment provides a smooth surface within the compartment making the storage tray and compartment easy to clean by an autoclave or the like.

Furthermore, the storage compartments are shaped so as to allow a dentist to use the compartments to mix stains or glazes. The flat, elliptical base of the storage compartments allows a dentist to mix stains or glazes to achieve a desired colour or colour gradient. Furthermore, the elliptical shape allows a dentist to create a colour gradient along the length of the major axis of the storage compartment.

In another embodiment the size of each storage compartment varies in dependence on the tooth to which the storage compartment corresponds. Varying the size of the storage compartment in dependence on the tooth that it corresponds to beneficially causes the arcuate arrangement of storage compartments to resemble a dental arch or jaw more closely. Furthermore, typically larger teeth require larger dental components and as such varying the size of the storage compartments ensures that each compartment is able to accommodate the necessary dental components.

In one embodiment the storage tray comprises at least one kidney-shaped dish for storing a multi-tooth dental component. The kidney-shaped dishes beneficially provide storage for larger dental components that relate to multiple teeth. For example a three-unit bridge may be stored within the kidney-shaped dish prior to commencing a procedure.

In another embodiment the storage tray may comprise a lid. Beneficially the lid provides a protective barrier between the storage tray and the external environment thereby maintaining the storage tray clean and sterile. The lid may be made from a rigid plastics material such as polycarbonate or may be a thin plastics sheet that is peelable off the top surface of the storage tray.

In an embodiment the lid is configured to retain each dental component in its respective compartment when the lid is attached to the tray. This advantageously prevents the dental components from falling out of their storage compartment during transportation or if the tray is knocked.

In one embodiment the lid may be UV protective. Beneficially providing a UV protective barrier between the external environment and the contents of the storage tray prevents dental components or chemical agents within the tray reacting with the UV light and potentially causing the contents of the tray to be damaged.

In another embodiment the tray may comprise a lip extending around an edge of the tray. The lip may be resiliently biased and the lip may be configured to provide a gripping force on the lid.

The lip beneficially provides a gripping force on the lid thereby securing the lid to the storage tray. The lip may comprises radially protruding tabs that act as stop to inhibit the vertical movement of the lid relative to the tray and also serve as a thumb tab to aid a user removing the lid.

In an embodiment the lid may comprise a skirt. The skirt may beneficially extend around the periphery or an edge of the tray. In another embodiment the skirt may comprise a plurality of ribs. The ribs may engage the outer surface of the tray thereby providing a gripping force to retain the lid on the tray.

In another embodiment the ribs may be positioned on an internally facing surface of the skirt and the ribs may be configured to prevent the internal surface of the skirt contacting the storage tray. In particular, the ribs may engage an outer surface of a lip of the tray. The ribs may be spaced angularly or circumferentially around the internal surface of the skirt. This is beneficial as the gaps between the ribs provide a flow path along which steam may flow. This allows steam to penetrate the contents of the tray during autoclaving thereby sterilising the lid, the tray and the contents of the tray.

In one embodiment the skirt may be shorter or shallower than the lip. This is beneficial as it ensures that the skirt does not contact the surface that the tray is sitting on as doing so may prevent steam from penetrating the contents of the tray. Furthermore, the gap between the base of the skirt and the surface the tray is sitting on makes it easier for the lid of the tray to be removed by a user.

In an embodiment the lid may comprise a shoulder or a ledge that extends along the top of the skirt or surrounds the top of the skirt. The ledge may be on an internal surface of the tray. The ribs may extend across the underside of the ledge and/or across the inner facing surface of the skirt. This is beneficial as the ribs ensure that there is a gap between the ledge and the top surface of the tray. This in turn provides a flow path for steam to penetrate the contents of the tray when the tray is being sterilised in an autoclave.

In another embodiment the ribs may be configured to engage a top surface of the tray and the ribs may be configured to prevent the ledge contacting the top surface of the tray, in use. The ribs may protrude from the underside of the shoulder and/or from the inner surface of the skirt to maintain a gap between the tray and the lid.

In one embodiment the tray may comprise at least one outwardly extending tab. The lid may comprise a recess for at least partially receiving the at least one radially extending tab. The outwardly or radially extending tabs beneficially provide a surface that a dentist may grip to allow them to easily remove the lid using one hand. A dentist may also squeeze the tabs inwardly to aid the removal of the lid from the tray.

In another embodiment the tray may comprise a skin or plastics cover extending over a top surface of the tray between the top surface of the tray and the lid. The skin beneficially retains dental components within their respective storage compartments when it is positioned over the top surface of the tray. This is particularly advantageous when the tray is being transported from a dental lab to a dentist. For example, dental components may be added to the appropriate storage compartments in a lab and then transported to a dentist. In this case, the skin may be applied in the lab to prevent the dental components becoming dislodged from their compartments during transportation of the tray. Furthermore, the dentist may autoclave the tray, with the skin and lid attached, to sterilise the tray and its contents when it arrives at the dental surgery.

In one embodiment the skin may be secured to the tray by the lid. This is beneficial as the skin may be positioned over the tray and the lid may then be positioned on the tray. The lid may grip and impart tension on the skin such that the skin is pulled across the top surface of the tray as the lid is lowered on to the tray.

In an embodiment at least a portion of the skin may be gripped between the lip and the ribs. The ribs beneficially maintain a gap between the inner surface of the lid and the lip of the tray such that steam may penetrate and sterilise the contents of the tray in an autoclave. The skin may be made from a thin plastics material that is suitable for being autoclaved. In another embodiment the skin may comprise a series of holes or pores. The pores beneficially allow steam to penetrate the skin and sterilise the contents of the storage compartments. The pores may be aligned with each storage compartment.

In another embodiment the tray may comprise a main body and a groove may be defined between an inner surface of the lip and the main body. The groove may extend around the periphery of the main body. The groove beneficially allows the lip to deform and exert a gripping force on the lid when the lid is placed on the tray thereby retaining the lid on the tray.

In one embodiment the main body of the tray may define a plane and the lip may extend generally perpendicularly to said plane. The lip may be generally downwardly extending from the top surface of the tray such that the groove is defined between the main body of the tray and an inner surface of the lip.

In an embodiment a bottom surface of the tray may comprise a mixing pad. This is advantageous as the base of the storage tray may be used to mix chemical agents for use in a procedure. A dentist may use multiple storage trays simultaneously such that one or more storage trays are used to store dental components and one or more upturned storage trays provide a mixing surface for mixing chemical agents for use in a dental procedure.

In one embodiment the tray may be manufactured from a medical-grade silicone. In another embodiment the tray may be manufactured from a single-use disposable plastics material.

According to another aspect of the present invention there is provided a storage tray in accordance with the previous aspect of the invention and at least one dental component.

In an embodiment the at least one dental component is located in a storage compartment relating to the position of the tooth the dental component relates to.

In another embodiment the dental kit may comprise a lid and a gap may be defined between the lid and the tray. The gap may be smaller than the at least one dental component being retained in the storage compartment. The lid may rest in flush engagement with the top surface of the storage tray when the lid is secured to the tray or the lid may define a gap that is smaller than the depth of the dental component thereby preventing the dental component falling out of the respective storage compartment.

According to a further aspect of the present invention there is provided a method of retaining a dental component within a storage compartment on a dental storage tray, the method comprising: placing a sheet material or skin over the dental storage tray; tensioning the sheet material by positioning a lid on the dental storage tray; wherein tensioning the sheet material comprises trapping a portion of the sheet material between the storage tray and the lid.

This is beneficial as dental components may be retained by the sheet material, for example an elastomeric plastics sheet, when the storage tray is being transported. The sheet material may be easily placed over the top of the dental component and the action of the lid being lowered over the tray may impart tension on the sheet material or skin such that the sheet material is pulled tight over the dental component.

In an embodiment tensioning the sheet material may cause the sheet material to at least partially conform to the shape of the dental component. In another embodiment tensioning the sheet material may cause the sheet material to press on a surface of the dental component thereby retaining the dental component within the storage compartment.

In another embodiment tensioning the sheet material may comprise lowering the lid onto the tray such that the trapped portion of sheet material is pulled tight as the lid is lowered.

Within the scope of this application it is expressly intended that the various aspects, embodiments, examples and alternatives set out in the preceding paragraphs, and/or in the following description and drawings, and in particular the individual features thereof, may be taken independently or in any combination.

BRIEF DESCRIPTION OF THE DRAWINGS

One or more embodiments of the invention will now be described, by way of example only, with reference to the accompanying drawings, in which.

DETAILED DESCRIPTION

In general terms embodiments of the invention relate to a storage tray for storing dental components. The storage tray comprises a plurality of storage compartments or sockets arranged along an arcuate path. The arced or arcuate path of the storage compartments represents the dental arch such that each storage compartment on the tray corresponds to the position of a tooth on a jaw. Furthermore, each storage compartment may be numbered using a dental notation system such as, for example, the Universal Notation System to further clarify the tooth that each compartment relates to. This is advantageous as the dentist can quickly identify the compartment that corresponds to each tooth by using both the numbering system and by the arcuate arrangement of the storage compartments.

The storage compartments may be used to store dental components for a dental procedure. For example, the storage compartments may store veneers, crowns, implants, orthodontics or any other dental component for use in a dental procedure. The storage tray may store a dental component corresponding to each tooth such that a dentist may quickly and easily identify the desired location of each dental component when carrying out a procedure. This is particularly advantageous when carrying out complex dental procedures that require work to be completed in multiple locations within a patient's mouth.

Figure 1:
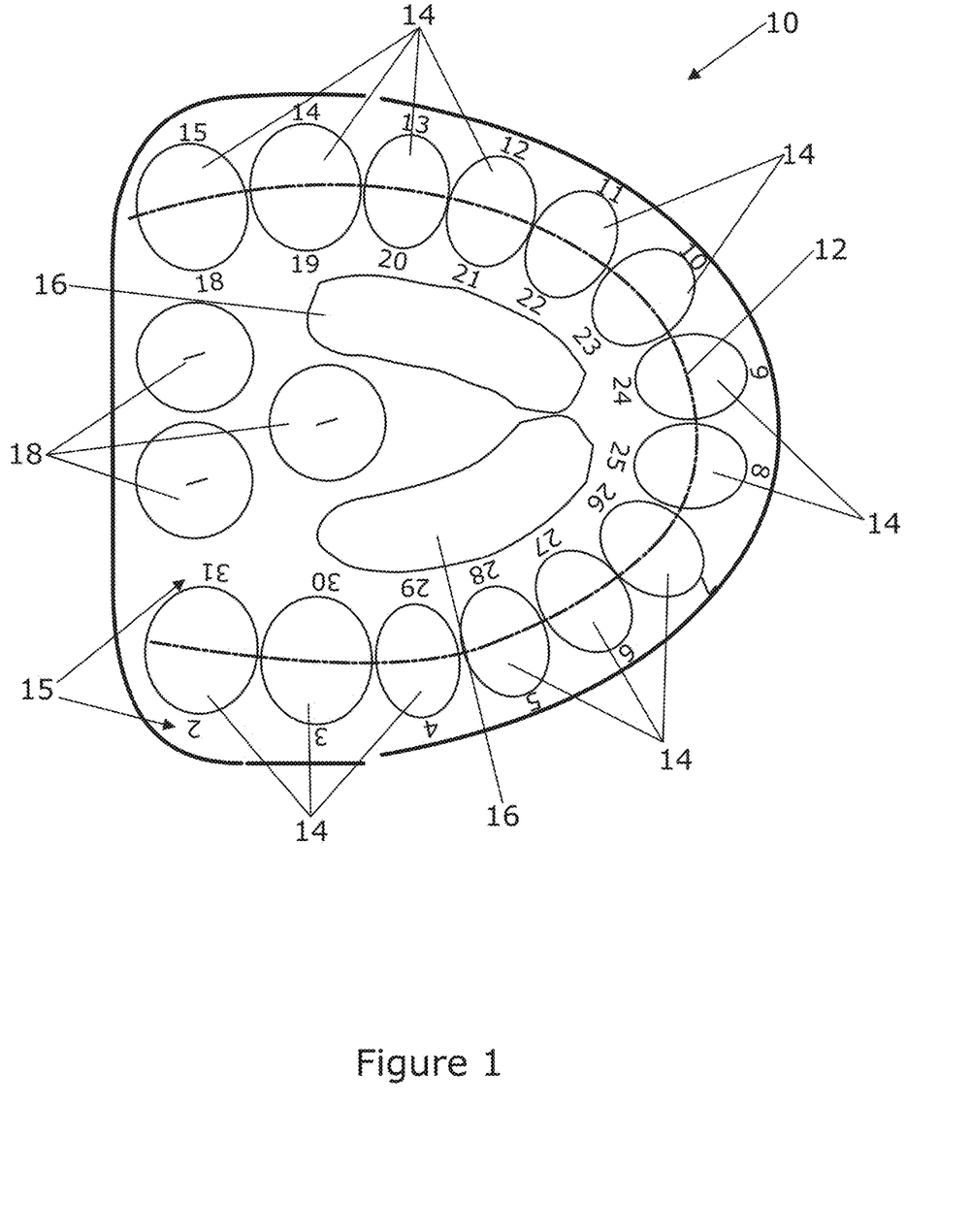
FIG. 1 is a schematic representation of a storage tray suitable for use with embodiments of the invention.

To place embodiments of the invention in a suitable context reference will firstly be made to FIG. 1 which is a schematic view of a storage tray 10 suitable for use with embodiments of the invention. The tray 10 comprises a plurality of storage compartments 14 arranged along an arcuate path 12. The arced path 12 is representative of a dental arch along which teeth are positioned within the mouth. The arched path 12 is symmetrical about a longitudinal axis 21 that intercepts the gap between the two front storage compartments 14 corresponding to the front incisors.

Each storage compartment 14 located on the arch 12 is representative of a tooth. As such a dentist may look at the storage tray 10 and quickly determine the tooth that each storage compartment 14 relates to through the visual distribution of the storage compartments 14 alone. This is beneficial as the dentist may quickly and efficiently identify the dental component required to be fitted to each tooth during a procedure. This not only reduces the likelihood of the dentist fitting a dental component incorrectly but also improves the efficiency of the dentist thereby reducing discomfort to the patient by reducing the overall time of the procedure.

A dental notation system 15 may also be used to annotate each storage compartment 14 to provide a further means of determining the tooth that each compartment 14 relates to.

Annotating each storage compartment 14 with a recognised dental notation system 15, such as the Universal Notation System, is advantageous as it relates each compartment 14 directly to a tooth in a patient's mouth. Thus the combination of the dental notation system 15 and arched layout of the storage compartments 14 make it very quick and easy for a dentist to identify the tooth that each storage compartment 14 relates to during a procedure.

Each storage compartment 14 is configured to store a dental component such as a veneer, crown, implant or orthodontic for use in a dental procedure. Prior to carrying out a dental procedure the dentist may prepare for the procedure by placing the dental components required for the procedure in a storage compartment 14 corresponding to the desired location of the dental component within the patient's mouth. This is particularly beneficial for procedures that require multiple dental components to be used across multiple locations on the dental arch or arches. The dentist can easily identify the tooth that each dental component is to be used on by both the position of the compartment 14 on the arch 12 and the dental notation system 15.

Figure 2:
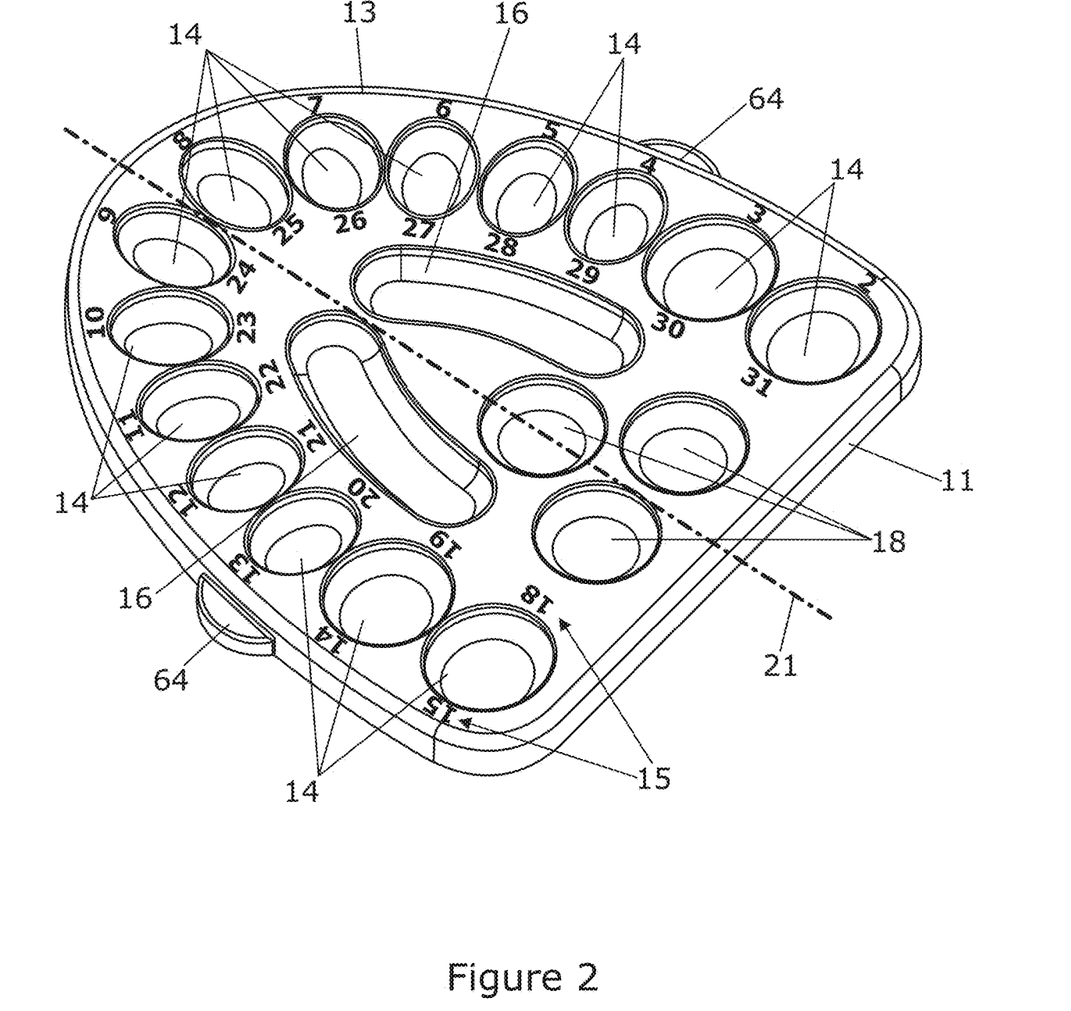
FIG. 2 is a perspective view of the storage tray of FIG. 1.

As shown in FIG. 2, the tray 10 comprises one flat side surface 11 and one arched side surface 13 extending from opposing ends of the flat side surface 11. The arched side 13 of the tray 10 resembles the arcuate path of the dental arch. The bottom surface of the tray 10 is flat such that the tray 10 can sit on a planar surface when in use. The tray 10 may represent the lower or upper dental arch of a patient.

The tray 10 is made from a medical-grade silicone material that can easily be cleaned and sterilised between procedures and also provides the required strength and rigidity. An autoclave may be used to sterilise the tray 10. The silicone body of the tray 10 may be between 5 mm and 20 mm thick. The medical-grade silicone may be, for example, high consistency rubber, liquid silicone rubber or anti-microbial silicone rubber or any other suitable material. Medical-grade silicone beneficially may be autoclaved to sterilise the tray 10 although other appropriate materials may be used.

Figure 3:
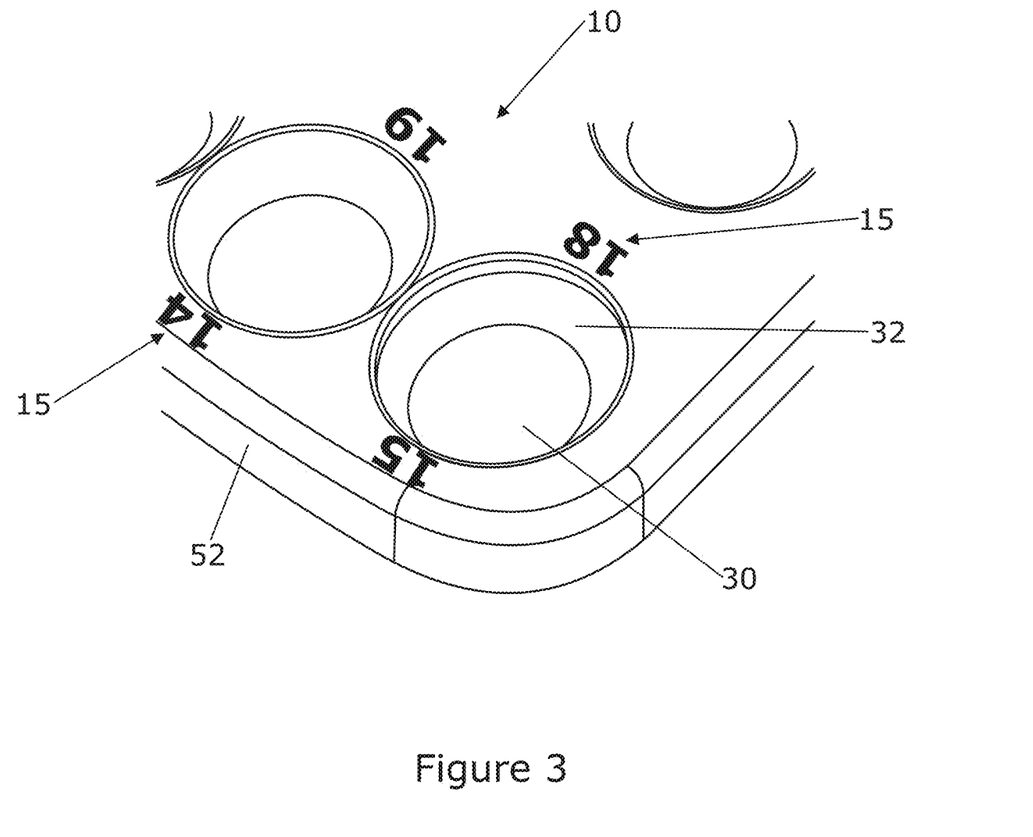
FIG. 3 is a detail perspective view of a storage compartment of the storage tray of FIG. 1.

The storage compartments 14 are elliptical recesses or sockets located on the top surface of the tray 10. The storage compartments 14 have a planar bottom surface 30 and concave side walls 32. Beneficially, the curved or concave side walls 32 provide a smooth transition from the side wall and planar bottom surface 30 of the storage compartments 14 making the storage tray 10 easier to clean and sterilise as there are no sharp corners that may accrue bacteria. Furthermore, the concave side walls 32 advantageously make it easier for a dentist to remove a dental component from within the storage compartment 14. The concave side walls 32 enable a dental component to be slid up the concave side wall 32 and out of the compartment 14. The storage compartments 14 may form a bowl-like shape in which there is no planar bottom surface.

The planar bottom surface 30 of the storage compartments 14 also beneficially may be used as mixing wells for stains and glazes. The elongated planar bottom surface 30 provides a flat surface upon which a dentist may mix stains or glazes. The elongated shape allows a dentist to create a colour gradient along the length of the major axis of the storage compartment 14. This allows a dentist to match the colour of the stain or glaze to a patient's tooth more accurately.

The storage compartments 14 located along the arched axis 12 are dimensioned such that they may at least partially receive dental components for use in a dental procedure. Typically, the compartments 14 are between about 2 mm and 10 mm deep such that a dental component may be located therein. Controlling the depth of the storage compartments 14 such that at least a portion of the dental component stored therein protrudes from the storage compartment 14 advantageously makes it easier for the dentist to grip and remove the dental component. The storage compartments 14 may have a major diameter of about 20 mm to 30 mm and a minor diameter of about 10 mm to 20 mm. The storage compartments 14 may take the shape of, for example, an ellipse or a rectangle.

Each storage compartment 14 may be a differing size depending on the size of the tooth the compartment 14 relates to. For example, the compartments 14 that relate to larger teeth such as molars or premolars may be larger to accommodate larger dental components for use on the large teeth. Conversely, smaller teeth such as incisors require smaller dental components and as such the storage compartments 14 relating to these teeth are dimensioned smaller accordingly.

As discussed previously, the tray 10 comprises a dental notation system 16 to number each storage compartment 14. The dental notation system 16 may be a numbering system, such as the Universal Numbering System, as shown in the accompanying figures. In this case the numbers two to fifteen are embossed on the outer side of the arched axis 12 adjacent each storage compartment 14 to represent the upper dental arch. Similarly, the numbers eighteen to thirty-one may be embossed on an inner side of the arched axis 12 corresponding to each tooth on the lower dental arch. Providing a dental notation system 15 for both the lower and upper arches on the same tray 10 is beneficial as the same tray 10 may be used for procedures on both the lower and upper arches.

The tray 10 further comprises two kidney-shaped dishes 16 located on the inner side of the arched axis 12. The kidney-shaped dishes 16 provide storage for larger dental components such as for three unit bridges. The kidney-shaped dishes 16 are defined by a kidney-shaped recess comprising a planar bottom surface and rounded side walls. The arched profile of the kidney-shaped dish beneficially substantially matches the profile of the dental arch. As such the kidney-shaped dish is dimensioned to accommodate the arched profile of a multi-tooth dental component such as a three unit bridge. The kidney-shaped dishes are positioned symmetrically about the longitudinal axis 21.

The tray 10 also comprises three circular storage compartments 18 positioned rearward of the kidney-shaped 16 dishes along the longitudinal axis 21. The circular storage compartments 18 may be used for etch and bond agents such as phosphoric acid etchant, hydrofluoric acid and silane coupling or any other chemical agents required to carry out a dental procedure. Providing storage compartments 18 for storing etch and bond agents is beneficial as it further improves the efficiency of the dental procedure. This is because all of the material required for the restoration procedure may be located on the tray 10 thus reducing the requirement of the dentist to have to look for various components. The dentist may select the required dental component from the tray 10 and then easily apply the necessary agents as required throughout the process. The tray 10 thus provides a single location for storing the required material for use in a restoration procedure.

Figure 4:
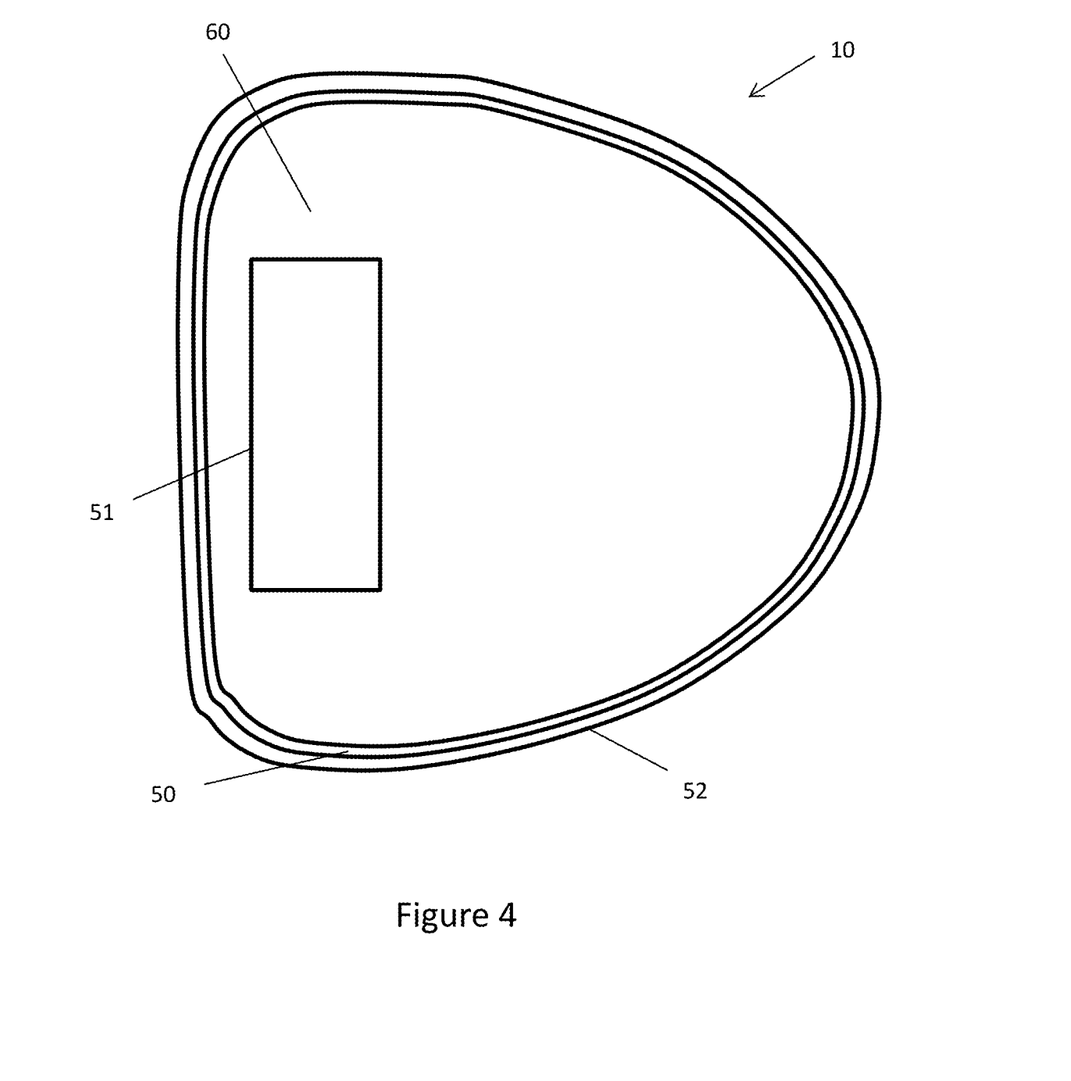
FIG. 4 is a view of the bottom of the storage tray of FIG. 1.

FIG. 4 shows the underside of the tray 10. The tray 10 comprises a mixing pad 60 on the underside of the tray 10. The flat base of the tray 10 may be used to mix agents for use by the dentist in a dental procedure. For example, the dentist may use the mixing pad 60 to mix the etch and bond agents as required. The dentist may use two or more trays 10 in a procedure. For example, the dentist may use a tray to store dental components for the lower arch, a tray 10 to store dental components for the upper arch and an upturned tray 10 to mix agents on the mixing pad 60. The silicone mixing pad 60 may be easily cleaned and sterilised by an autoclave or the like. The underside of the tray 10 may also comprise a tooling plate 51. The tooling plate 51 may include information relating to the tray 10.

A groove 50 runs around the periphery of the tray 10. A compliant lip 52 defines the external wall of the groove 50. The lip 52 is compliant such that when the lid 40 is positioned on the tray 10 the lip 52 may move inwardly towards the centre of the groove 50. The lip 52 is resiliently biased and provides an outward gripping force on the lid 40 thereby securing the lid 40 to the tray 10 when the lid 40 deforms the lip 52. Furthermore, the compliant lip 52 beneficially accounts for any manufacturing tolerances in the tray 10 and the lid 40.

The tray 10 further comprises two outwardly extending tabs 64. The outwardly extending tabs 64 are positioned on the lip 52 on mutually opposing sides of the longitudinal axis 21. The tabs 64 may be used to manipulate the tray 10. As shown in FIG. 2, tabs 64 extend outwardly from opposing sides of the lip 52. The outwardly extending tabs 64 act as a handle for a user of the tray 10 thereby allowing the tray 10 to be easily gripped and moved by a user. Furthermore, the tabs 64 allow the lip 52 to be squeezed and pushed inwardly thereby aiding the removal of the lid 40 of the tray 10.

Figure 5:
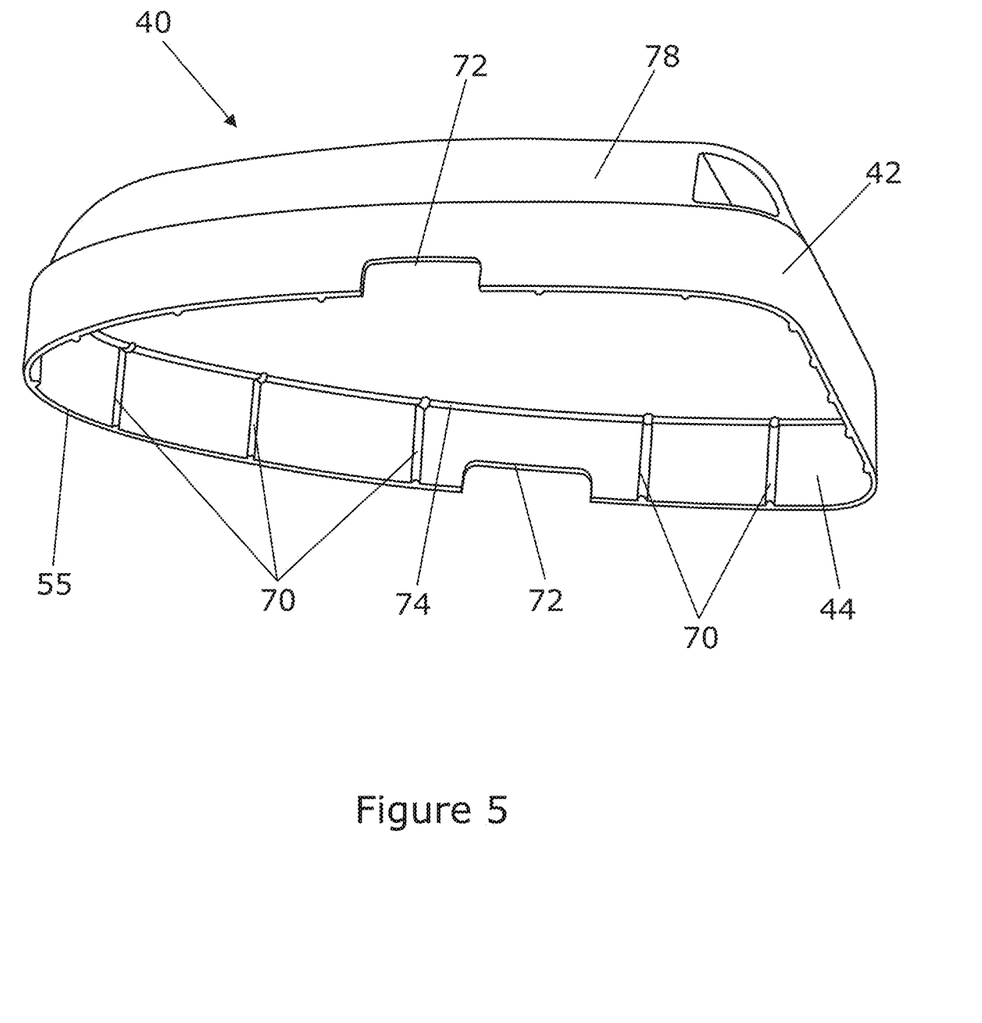
FIG. 5 is a perspective view of a lid for use with the storage tray of FIG. 1.
Figure 6:
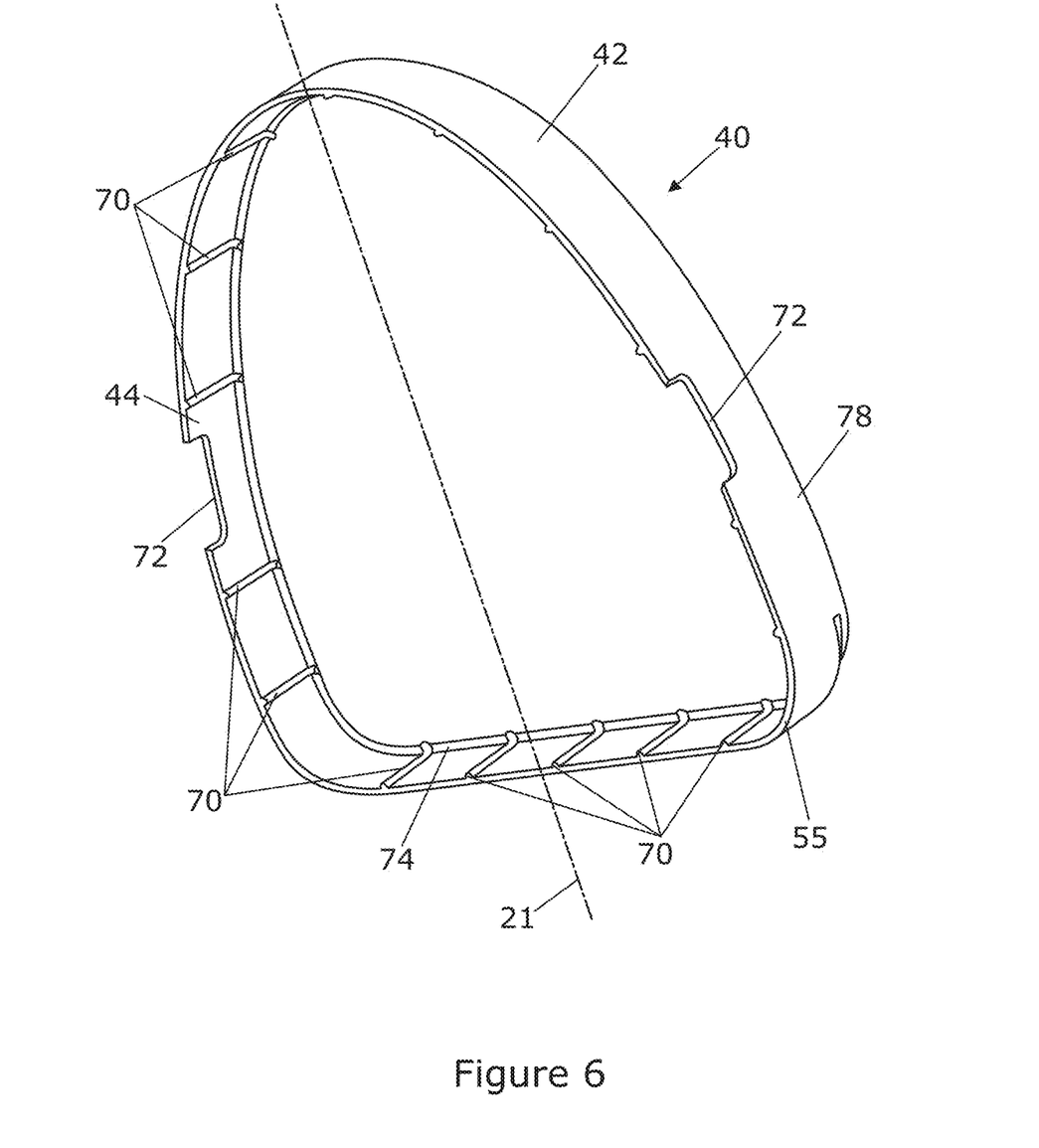
FIG. 6 is an alternative perspective view of the lid of FIG. 5.

FIGS. 5 and 6 show perspective views of the lid 40 for the tray 10. The external profile of the lid 40 is shaped such that the lid 40 covers the entire top surface of the tray 10 when the lid 40 is attached to the tray 10. The lid 40 comprises a downwardly-depending flange or skirt 42 extending around the periphery of the lid 40. When the lid 40 is positioned on the tray 10 the skirt 42 extends around the periphery of the tray 10. As such, the tray 10 is at least partially received beneath the skirt 42 of the tray 10. The skirt 42 beneficially locates the lid 40 on the tray 10 and further reduces the ingress of dust or dirt into the tray 10.

The lid 40 further comprises a series of ridges or ribs 70 for gripping the tray 10 and securing the lid 40 to the tray 10. The ribs 70 are positioned on an internal surface 44 of the skirt 42 on the lid 40. The ribs 70 are spaced angularly around the inner surface 44 of the skirt 42 and extend orthogonally relative to a bottom edge 55 of the skirt 42 and traverse the full height or depth of the skirt 42. The ribs 70 protrude inwardly away from the inner surface 44 of the skirt 42. For example, the ribs 70 may protrude from the inner surface 44 by about 1 mm to 3 mm.

When the lid 40 is positioned on the tray 10, the ribs 70 engage, slightly deform and grip the outer surface of the more flexible and resilient lip 52 thereby securing the lid 40 to the tray 10. More specifically, when the lid 40 is secured to the tray 10 the ribs 70 on the internal surface 44 of the lid 40 engage the lip 52. The lip 52 is deformed towards the centre of the groove 50 by the ribs 70 on the internal surface 44 and the lip 52 provides a resilient gripping force on the ribs 70 thereby securing and retaining the lid 40 to the tray 10.

When the lid 40 is positioned on the tray 10, the ribs 70 on the inner surface 44 of the skirt 42 engage the outer surface of the lip 52. Thus, a series of gaps 76 are created between the skirt 42 and the outer surface of the lip 52 by the ribs 70. The gaps 76 created by the ribs 70 between the skirt 42 and the lip 52 beneficially provide flowpaths along which steam may flow when the tray 10 is being sterilised in an autoclave. Steam in the autoclave may penetrate the tray 10 by flowing along the flowpaths created by the gaps 76 between the ribs 70.

The lid 40 further comprises a cover portion 78 that extends over the top surface of the tray 10, in use. A ledge or shoulder 74 surrounds the cover portion 78 of the lid 40 and joins the skirt 42 to the cover portion 78. As best viewed in FIG. 6, the ribs 70 each have an inverted L-shape and comprise a major portion that crosses the inner surface 44 of the skirt 42 and a minor portion that crosses the underside of the shoulder 74. The minor portion of each rib 70 under the shoulder 74 and the major portion of each rib 70 on the inner surface 44 of the skirt are mutually perpendicular. This orthogonal relationship between the major and minor portions of the rib beneficially corresponds to the orthogonal relationship between the lip 52 and the top surface of the tray 10. As such, the ribs 70 may contact both the lip 52 and the top surface of the tray 10 when the lid 40 is secured to the tray 10.

When the lid 40 is placed on the tray 10, the minor portions of the ribs 70 located under the shoulder 74 abut the top surface of the tray 10 thereby controlling and inhibiting further vertical movement of the lid 40 relative to the tray 10. This beneficially ensures that the shoulder 74 does not rest on the top surface of the tray 10 as doing so would create a seal and block the flow path for steam to penetrate the contents of the tray 10 during autoclaving. Similarly, the major portions of the ribs 70 positioned on the inner surface 44 of the skirt 42 abut the outer surface of the lip 52 to retain the lid 40 on the tray 10 and to control the position of the skirt 42 relative to the lip 52. The ribs 70 serve to secure the lid 40 to the tray 10 and also to ensure that an unobstructed flow path is maintained between the tray 10 and the lid 40 for steam during autoclaving.

The lid 40 further comprises two recesses or notches 72 through the skirt 42 that interrupt the bottom edge 55. The notches 72 are positioned on the skirt 42 in mutual opposition about the longitudinal axis 21 such that when the lid 40 is positioned on the tray 10 the notches 72 align with the tabs 64. The tabs 64 are at least partially received by the respective notches 72 when the lid 40 is placed on the tray 10. The notches 72 accommodate the tabs 64 and thereby beneficially ensure that the lid 40, and in particular the ribs 70, may engage the top surface of the tray 10 when the lid 40 is positioned on the tray 10.

Figure 7:
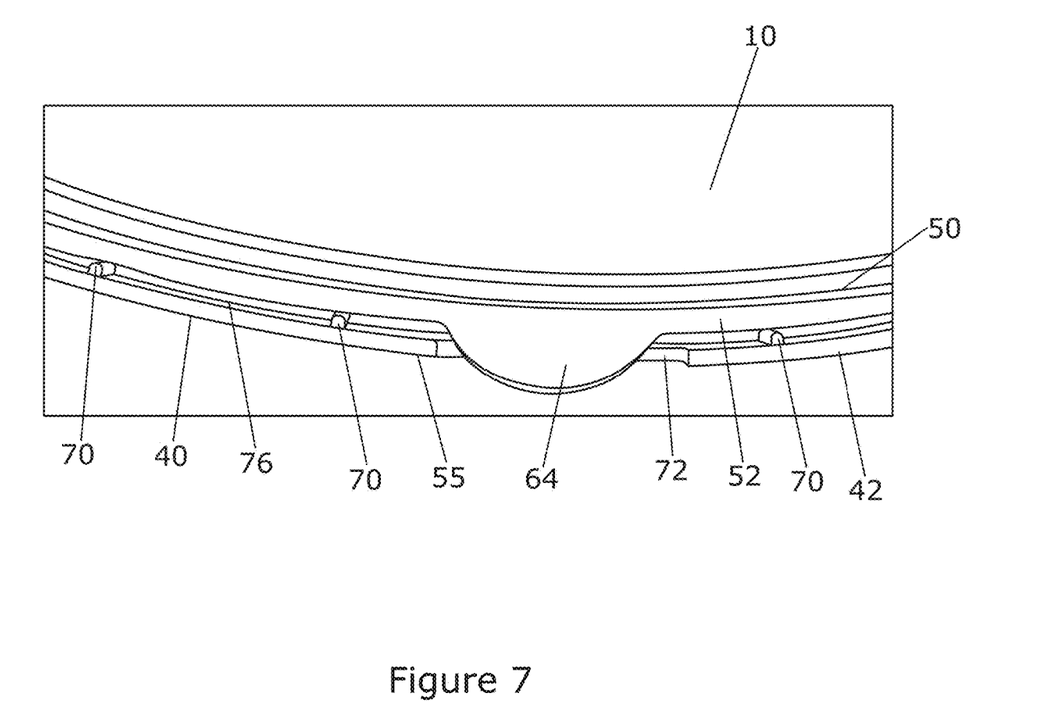
FIG. 7 is detail view of the underside of the tray fitted with the lid.

FIG. 7 is a detailed view of part of the underside of the tray 10 with the lid 40 attached. As shown in FIG. 7 the ribs 70 engage the outer surface of the lip 52 of the tray 10. A series of narrow gaps 76 are created between the skirt 42 of the lid 40 and the lip 52 of the tray 10. As outlined above, the gaps 76 are beneficial as they provide a path for steam to penetrate the contents of the tray 10 when the tray 10 is being autoclaved. As such, the tray 10 may be positioned within the autoclave with the lid 40 secured to the tray 10 thereby allowing the tray 10, the contents of the tray 10 and the lid 40 to be sterilised simultaneously in the autoclave.

The groove 50 and the compliant lip 52 furthermore provide an expansion relief for the tray 10. When the assembly of the tray 10 and the lid 40 is autoclaved, the tray 10 may expand as a result of the heat from the steam. As the tray 10 expands it exerts a radially outward force on the skirt 42 of the lid 40. The radially outward force presses on the skirt 42. By virtue of the groove 50 and the compliant lip 52, the tray 10 can expand without over-stressing the surrounding skirt 42 of the lid 40. This is beneficial as it prevents the lid 40 from being damaged or cracked as a result of the tray 10 expanding. Furthermore, the expansion relief feature of the compliant lip 52 and groove 50 ensures that a user may easily remove the lid 40 even when the tray 10 is at an elevated temperature and thus in an expanded state. Without the compliant lip 52 the lid 40 may remain lodged or stuck to the tray 10 after the tray 10 is autoclaved.

Figure 8:
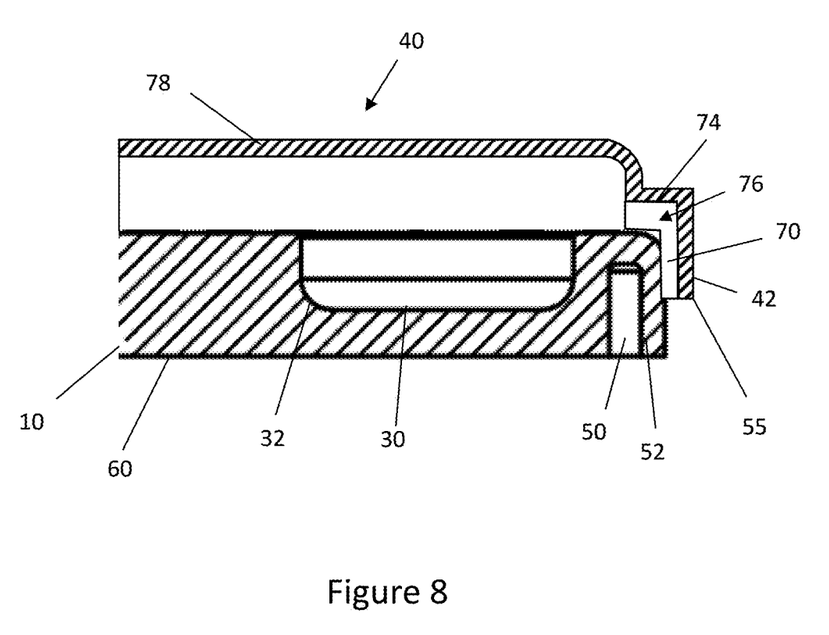
FIG. 8 is a cross-sectional side view of the tray of FIG. 1 fitted with the lid.

Turning now to FIG. 8, the tray 10 is shown in a detailed cross-sectional side view fitted with the lid 40. The lid 40 is configured to be secured to the tray 10 to provide a protective barrier between the tray 10 and the external environment. This is advantageous as it helps to ensure the tray 10, and its contents, are kept clean and sterile. Additionally, the lid 40 helps to hold the contents of the tray in their chosen positions.

FIG. 8 makes clear how the ribs 70 abut the top surface of the tray 10 and the outer surface of the lip 52 when the lid 40 is positioned on the tray 10. The ribs 70 beneficially maintain a gap 76 between the shoulder 74 and the top surface of the tray 10 as well as between the lip 52 and the skirt 42. The gap 76 defines a flow path for steam to penetrate the contents of the tray 10. Furthermore, as shown in FIG. 8 the skirt 42 is shorter or shallower than the lip 52. Consequently, when the lid 40 is positioned on the tray 10 while the tray 10 is supported by a surface such as a platform within an autoclave, the skirt 42 does not contact that surface and its bottom edge 55 is instead held clear of that surface. This further ensures that the flow path for steam is not obstructed by the lid 40 during autoclaving.

The lid 40 is dimensioned such that when it is secured to the tray 10 the internal surface remains close to the top surface of the tray 10, typically about 1 mm and 20 mm above the top surface of the tray 10. When the lid 40 is secured to the tray 10 it may be configured to retain any dental components located within a storage compartment 14 within their respective compartments 14. This is advantageous as it prevents any dental components located within the tray 10 from being dislodged from their correct storage compartment 14

The lid 40 may be made from a plastics material, for example polycarbonate. The lid 40 is autoclavable such that it may be easily cleaned and sterilised between procedures. Furthermore, the lid 40 may be UV protective such that UV light is absorbed or reflected by the lid 40. Providing the tray 10 with a UV resistant lid 40 is beneficial as some dental components are sensitive to UV light and as such it is desirable to shield the dental components from UV light. Furthermore, the chemical etch and bond agents stored within the circular storage compartments 18 may be cured by UV light and thus require shielding from ambient UV light. In this scenario the dentist may prepare for a procedure by positioning the required chemical agents in the circular storage compartments 18 and then covering the tray 10 with the lid 40. The UV resistant lid 40 would prevent the chemical agents reacting with the UV light thereby ensuring they do not cure prior to use in the procedure.

The tray 10 may be supplied to a dentist as a pre-prepared kit. For example, the dental components may be manufactured bespoke for a patient in a lab or factory. The bespoke dental components may then be positioned in the storage compartment 14 relevant to the tooth that the dental component is designed for.

In this scenario the tray 10 may be delivered to the dentist as a sealed kit such that the pre-procedure preparation is substantially completed at the lab. Beneficially this further improves the efficiency of the dentist as it removes the requirement for the dentist to spend time preparing the dental components ahead of a dental procedure. The tray 10 may be made from a disposable plastics material and the lid 40 may be a sheet of plastics material glued to the top of the tray 10. The kit is sterilised in the lab and the plastics lid 40 may keep the kit sterile throughout.

Figure 9:
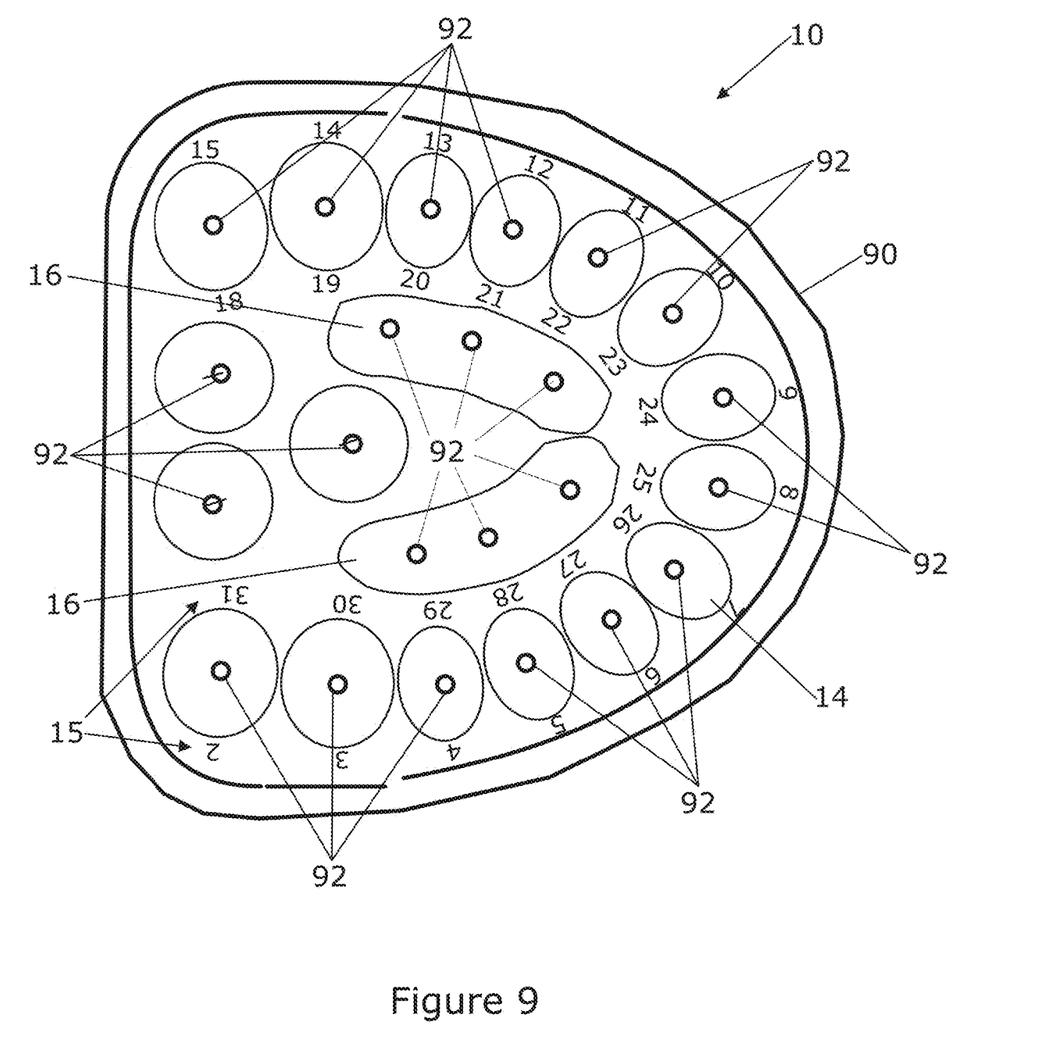
FIG. 9 is a schematic representation of the tray of FIG. 1 with a skin positioned over a top surface of the tray.

Turning now to FIG. 9, the tray 10 is shown with the lid 40 removed and with a plastics cover or skin 90 positioned over the top surface of the tray 10. The skin 90 is configured to be retained between the tray 10 and the lid 40 such that it may prevent dental components from falling out of their respective storage compartment 14. When the lid 40 is positioned on the tray 10 the lid 40 engages the skin 90, thereby pulling it tight across the top surface of the tray 10 such that the skin 90 encloses the storage compartments 14. The skin 90 beneficially prevents dental components located within the storage compartment 14 from becoming dislodged from their respective storage compartment 14.

Figure 10:
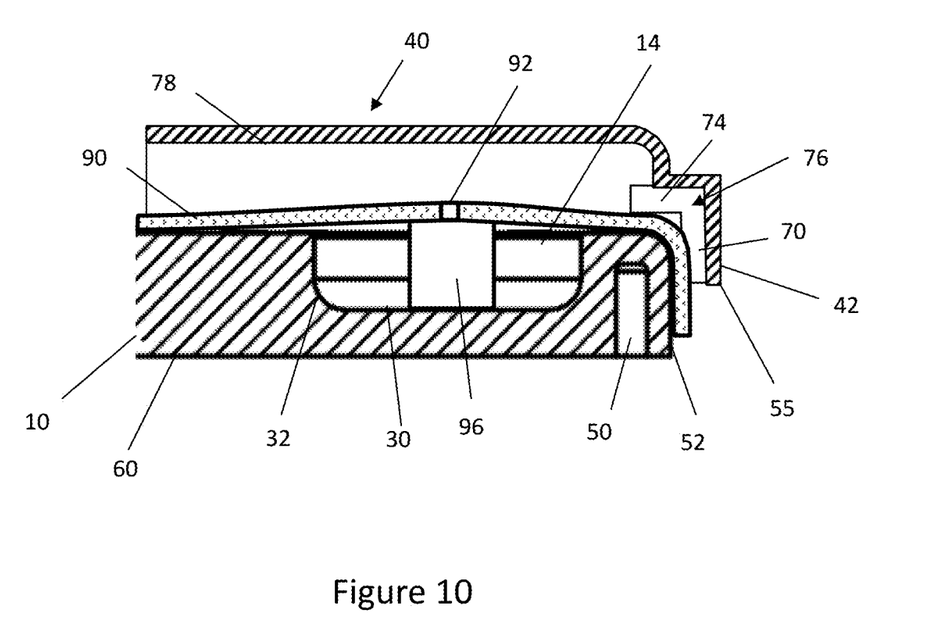
FIG. 10 is cross-sectional side view of the tray of FIG. 9 fitted with a lid over the skin.

FIG. 10 is a cross-sectional side view of the skin 90 retaining a dental component 96, for example a crown or veneer, within the storage compartment 14. The skilled reader will appreciate that the dental component 96 is illustrated schematically in FIG. 10 for clarity. As shown in FIG. 10, the skin 90 is stretched over the top surface of the tray 10 such that it engages the dental component within the storage compartment 14 thereby pressing on a portion of the dental component 96 and retaining it within the storage compartment 14.

When the lid 40 is positioned on the tray 10 the ribs 70 contact and grip or trap the skin 90 between the lip 52 and the lid 40 hereby imparting tension on the skin 90 and pulling the skin 90 tight. As the lid 40 is lowered over the tray 10 the ribs 70 grip the skin 90 and pull the skin tight over the top surface of the tray 10. When the lid 40 is positioned on the tray 10 the skin 90 is gripped between the ribs 70 and the outer surface of the lip 52 thereby securing the skin 90 to the tray 10. In the embodiment shown in FIG. 10, the skirt 42 does not contact the skin 90 such that a gap 76 is maintained to allow steam to penetrate the contents of the tray 10 when the tray is autoclaved.

The skin 90 is an elastomeric plastics sheet that is configured to stretch and generally conform to the shape of a dental component 96 retained within a storage compartment 14. The skin 90 is dimensioned such that it extends beyond and follows the general planar shape of the outer perimeter of the tray 10. As shown in FIG. 10, the skin 90 extends beyond the outer surface of the tray 10 by approximately the same distance as the height of the lip 52. This is beneficial as the over-sized skin 90 may be gripped between the ribs 70 and the outer surface of the lip 52. The downward movement of the lid 40 relative to the tray 10 causes the lid 40 to engage the portion of the skin 90 that overhangs the top surface of the tray 10 such that the skin 90 is pulled tight over the top surface of the tray 10.

The gap 76 is beneficially maintained when the skin 90 is secured between the tray 10 and the lid 40. As such, the flow path for steam to penetrate the contents of the tray 10 is not obstructed by the presence of the skin 90. Furthermore, as best viewed in FIG. 9, the skin 90 comprises a series of holes 92 or pores configured to allow steam to penetrate each storage compartment 14. This is beneficial as the entire tray 10 and lid 40 may be autoclaved with the skin 90 in place such that the tray 10 and its contents may be easily sterilised without the requirement for the skin 90 to be removed.

The tooling plate 51 may be a label that specifies the contents of the tray 10 and may include details of the patient that the dental components within the tray 10 are destined for.

Figure 11:
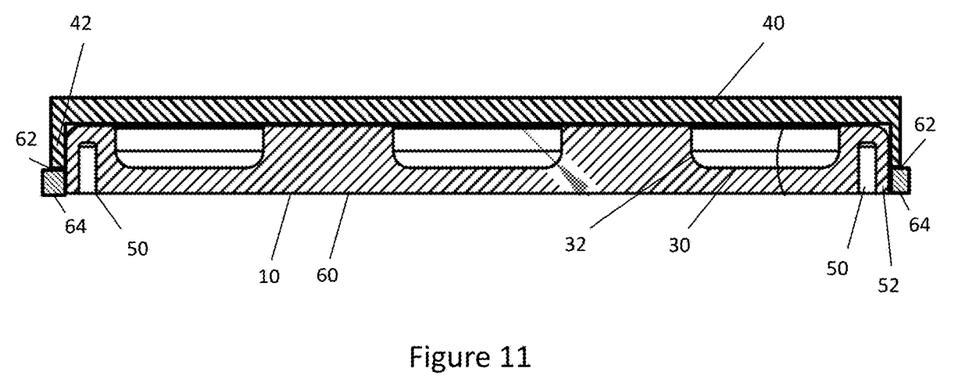
FIG. 11 is a cross-sectional side view of the tray of FIG. 1 fitted with a lid according to another embodiment.
Figure 12:
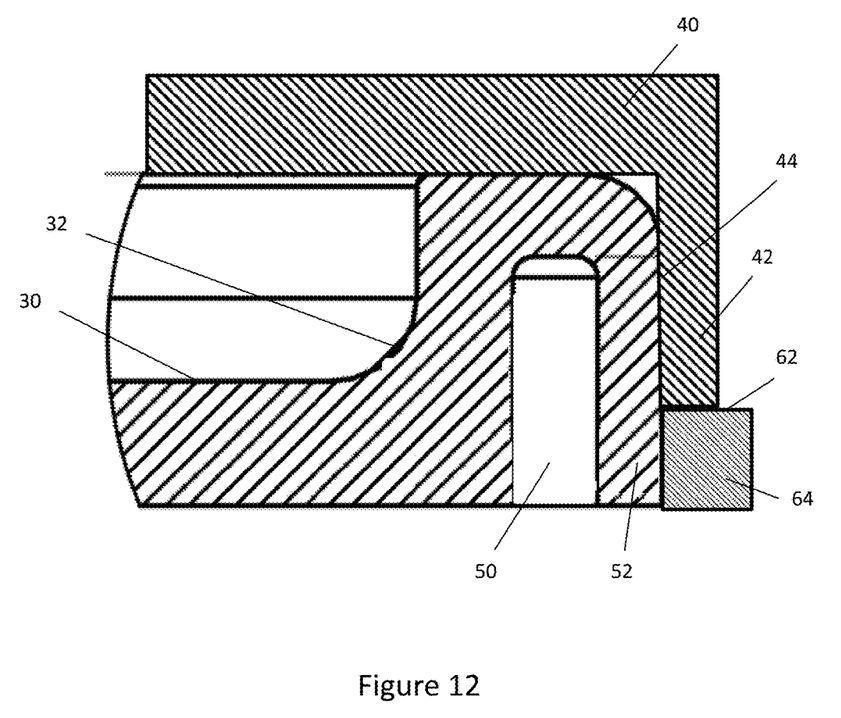
FIG. 12 is an enlarged cross-sectional side view of the tray and lid of FIG. 11.

FIG. 11 and FIG. 12 show cross-sectional views of the lid 40 and tray 10 according to another embodiment. In the embodiment shown in FIG. 10 and FIG. 11 the lid 40 does not comprise the notch 72 and as such the outwardly extending tabs 64 may be used to control the vertical movement of the lid 40. When the lid 40 is secured to the tray 10 the skirt 42 may engage the outwardly protruding tab 64. The outwardly protruding tab 64 acts as a handle for a user of the tray 10 to easily grip and manipulate the position of the tray 10. The radially protruding tab 64 may also serve as a stop for the lid 40. The skirt 42 of the lid 40 abuts a top surface 62 of the tab 60 thereby limiting the vertical movement of the lid 40 relative to the tray 10. The skirt 42 and the tab 64 may be dimensioned to control the size of the gap between the lid 40 and the top surface of the tray 10. The skilled reader will appreciate that if the recess of the storage compartments 14 is sufficient to fully receive the dental component then the lid 40 may lie flush with the top surface of the tray 10.

It will be appreciated that various changes and modifications can be made to the present invention without departing from the scope of the present application.

The invention claimed is:

1. A storage tray for storing dental components, the storage tray comprising:
 a lid, the lid comprising a skirt extending around an edge of the lid, wherein the skirt comprises a plurality of ribs;
 a plurality of compartments arranged along an arc representative of a dental arch, each of the plurality of compartments corresponding to the position of a respective tooth on the dental arch;
 a resiliently biased lip extending around an edge of the tray, and wherein the lip is structured and arranged to provide a gripping force on the lid; and
 wherein the plurality of ribs are positioned on an inwardly-facing surface of the skirt, and wherein the plurality of ribs are structured and arranged to maintain a gap between the inwardly-facing surface of the skirt and the lip.

2. The storage tray as claimed in claim 1, wherein the lid further comprises a shoulder that surrounds a top of the skirt.

3. The storage tray as claimed in claim 2, wherein the plurality of ribs extend across an underside of the shoulder.

4. The storage tray as claimed in claim 1, further comprising at least one outwardly extending tab located on an outer-facing surface of the lip.

5. The storage tray as claimed in claim 1, wherein the lid is configured to retain each dental component in a respective one of the plurality of compartments when the lid is attached to the tray.

6. The storage tray as claimed in claim 1, further comprising a skin extending over a top surface of the tray between the top surface of the tray and the lid.

7. The storage tray as claimed in claim 6, wherein the skin is secured to the tray by the lid.

8. The storage tray as claimed in claim 7, wherein at least a portion of the skin is gripped between the lip and the plurality of ribs.

9. The storage tray as claimed in claim 6, wherein the skin comprises one or more pores for allowing steam to penetrate at least one of the plurality of compartments.

10. The storage tray as claimed in claim 1, further comprising a main body, and wherein a groove is defined between an inner surface of the lip and the main body.

11. A dental kit, comprising:
 a storage tray including:
  a lid, the lid comprising a skirt extending around an edge of the lid, wherein the skirt comprises a plurality of ribs;
  a plurality of compartments arranged along an arc representative of a dental arch, each of the plurality of compartments corresponding to the position of a respective tooth on the dental arch;
  a resiliently biased lip extending around an edge of the storage tray, wherein the lip is structured and arranged to provide a gripping force on the lid;
  wherein the plurality of ribs are positioned on an inwardly-facing surface of the skirt, and wherein the plurality of ribs are structured and arranged to maintain a gap between the inwardly-facing surface of the skirt and the lip; and
 at least one dental component.

12. The dental kit as claimed in claim 11, wherein the at least one dental component is located in a respective one of the plurality of compartments corresponding to the position of the tooth to which the dental component relates to.

13. The dental kit as claimed in claim 11, wherein a second gap is defined between the lid of the dental kit and the tray, and wherein the second gap is smaller than the at least one dental component being retained in a respective one of the plurality of compartments.

14. A storage tray for storing dental components, the storage tray comprising:
 a lid;
 a plurality of compartments arranged along an arc representative of a dental arch, each of the plurality of compartments corresponding to the position of a respective tooth on the dental arch;
 a resiliently biased lip extending around an edge of the tray, wherein the lip is structured and arranged to provide a gripping force on the lid;
 a skin extending over a top surface of the tray between the top surface of the tray and the lid, wherein the skin is secured to the tray by the lid; and
 wherein the lid includes a skirt extending around an edge of the lid and a plurality of ribs, and wherein at least a portion of the skin is gripped between the lip and the plurality of ribs.

* * * * *